May 31, 1938.    A. L. SCHUYLER ET AL    2,118,948
LOCK CENTER AND METHOD OF FORMING IT
Filed June 14, 1935    2 Sheets-Sheet 1

INVENTORS
A. L. SCHUYLER
R. B. KNOTH
A. R. MacLAGAN
BY E. R. Nowlan
ATTORNEY

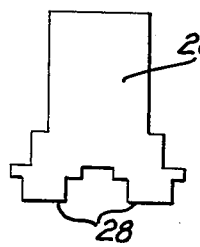
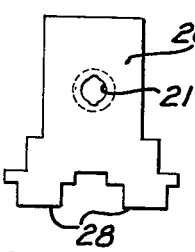
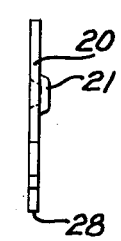
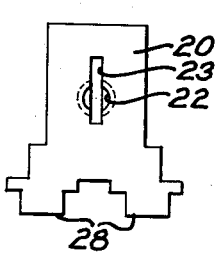
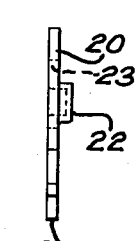
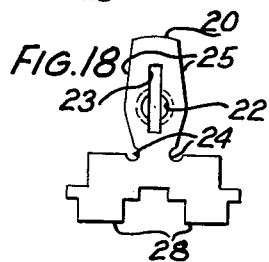
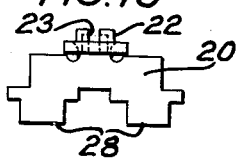
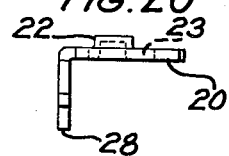
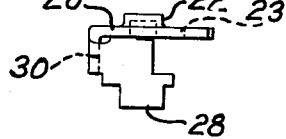
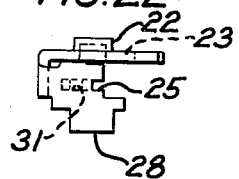
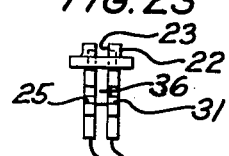
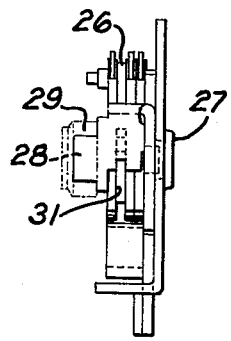
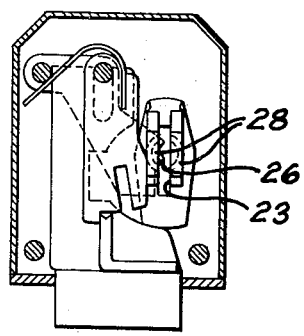

Patented May 31, 1938

2,118,948

UNITED STATES PATENT OFFICE 2,118,948

LOCK CENTER AND METHOD OF FORMING IT

Andrew L. Schuyler, La Grange, Richard B. Knoth, Chicago, and Allan R. MacLagan, Western Springs, Ill., assignors to Western Electric Company, Incorporated, New York, N. Y., a corporation of New York Application June 14, 1935, Serial No. 26,597

6 Claims. (Cl. 29—148)

This invention relates to locks, and more particularly to rotor centers for tumbler type lock centers and a method of forming them, and a method of manufacturing them.

An object of the present invention is to provide a simple and inexpensive lock center or barrel and an economical method of manufacturing it.

In accordance with one embodiment the invention contemplates, as applied to locks for telephone pay station equipment, a center formed of sheet metal stock by stamping, swaging, punching, shaving and bending operations and milling the barrel portion of the center to its final contour.

In accordance with another embodiment the steps outlined for the first embodiment are followed except that a single milling operation is performed in the lock center after all of the bending operations to form a slot therein for co-operation with the stationary tumbler of the lock. The milling operation mentioned in connection with the first embodiment is not necessary in this embodiment. Both of these embodiments are particularly adaptable to locks of the type disclosed in the patent to O. A. Shann 1,793,254 of February 17, 1931.

Other features and advantages of the invention will become apparent from the following detailed description when considered in conjunction with the accompanying drawings, wherein—

Figs. 13 to 23 are illustrative of the steps taken in forming a lock center or barrel according to another embodiment of the invention;

Fig. 24 is a plan view of a lock, having a center or barrel, of the type formed in accordance with the steps illustrated in Figs. 13 to 23, inserted therein, and having the cover plate removed to show the parts more clearly, and Fig. 25 is a side elevational view of the lock shown in Fig. 24.

In the embodiment of the invention disclosed in Figs. 1 to 12, a blank 1 is stamped from sheet metal stock having four apertures 2 therein which in the blanking operation are joined to the edges of the blank. These apertures are formed in the blank to simplify future bending operations.

Figure 1:
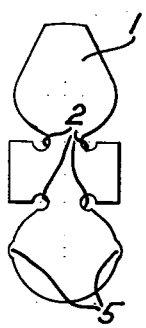
Figs. 1 to 10 are illustrative of the various steps followed in forming a lock center or barrel.
Figure 2:
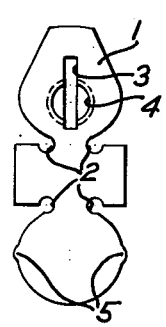
Figure 3:
Figure 4:
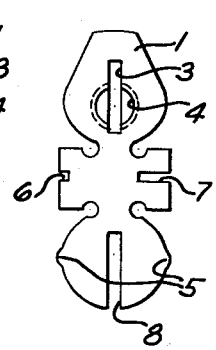
Figure 5:
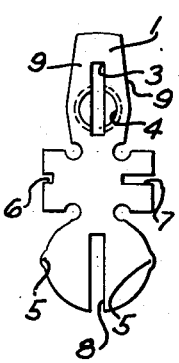

After the blank 1 has been stamped as shown in Fig. 1, a second operation is performed thereon which perforates a slot 3 therein and swages or embosses the metal of the upper portion of the blank as shown at 4 to form an indentation on one side and a raised portion on the other side through which the slot 3 extends as clearly shown in Figs. 2 and 3, Fig. 2 being a plan view and Fig. 3 being a side elevational view of the same step. It will be noted by referring back to Figs. 1 and 2 that the lower portion of the blank 1 has a pair of ears or lugs 5 extending therefrom which are formed in the stamping operation.

After the blank 1 has been swaged or embossed and slotted as shown in Figs. 2 and 3, a pair of slots 6 and 7 are formed in the mid portion of the blank, and a slot 8 is formed in the lower portion of the blank in one punch press operation. After these slots have been formed in the blank, the upper portion is shaved along the lines 9—9 to reduce the upper portion of the blank and complete the formation of the part which will eventually be the lever portion of the barrel or lock center.

Figure 6:
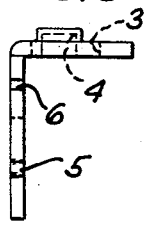
Figure 7:
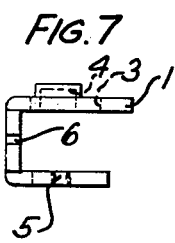

After these punch press operations have been performed, the upper portion of the blank 1 is bent at right angles to the mid portion as shown in Fig. 6 and in the next succeeding step the lower portion of the blank 1 is bent at right angles to the mid portion as shown in Fig. 7.

Figure 8:
Figure 9:
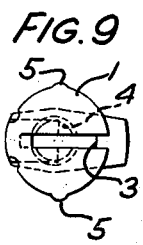
Figure 10:
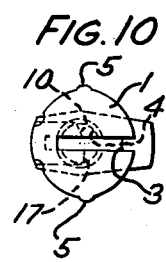
Figure 12:
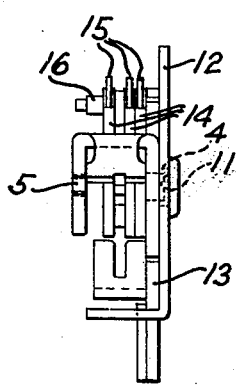
Fig. 12 is a side view of the lock shown in Fig. 11.
Figure 11:
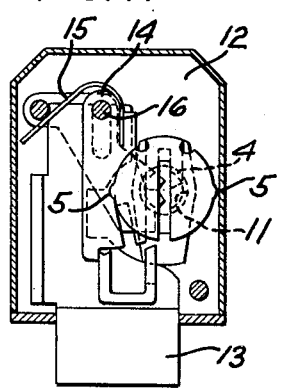
Fig. 11 is a plan view of a lock with the lock center or barrel of the type formed according to the steps disclosed in Figs. 1 to 10, inserted in a lock, the cover plate of the lock being removed to show the parts more clearly.

The next step in the operation comprises the bending of the sides of the mid portion having the slots 6 and 7 therein. This is accomplished by bending the two sides first to approximately a 45° angle from the central part of the mid portion of the blank 1 as shown in Fig. 8 and then completing the bending of the blank by bending the two sides approximately another 45° to the ultimate position as shown in Fig. 9 wherein the two sides are at right angles to the remainder of the mid portion. After the forming and punching operations have been completed, the barrel or lock center will appear as shown in Fig. 9, and it is then ready for the final milling operation to bevel the side of the mid portion adjacent the slot 6 and round the edge of the side of the mid portion adjacent the slot 7 as shown at 10 and 17, respectively, (Fig. 10). This last operation is a milling operation and of course the burrs formed in the milling operation must be removed, whereupon the lock center is complete and ready for assemblage with the other portions of the lock in the manner shown in Fig. 11, wherein the embossed or swaged portion 4 shown projecting from the left side of the blank 1 in Fig. 3 extends into a corresponding embossed depression 11 in a base 12 upon which the parts of the lock are mounted (see also Fig. 12). The lock into which the barrel or lock center of the type manufactured in accordance with the steps illustrated in Figs. 1 to 10 is of the same type as that shown in the patent to O. A. Shann 1,793,254 and comprises generally a bolt 13, tumblers 14, normally urged in a counterclockwise direction by springs 15 about a stud or pin 16 which also serves as a guide for the bolt 13.

In the other embodiment of the invention mentioned hereinbefore, a blank 20 is stamped from sheet metal stock to the configuration shown in Fig. 13. The blank 20 is then partially embossed as shown at 21 (Figs. 14 and 15) and afterwards finally embossed to the configuration shown at 22 (Figs. 16 and 17) and a slot 23 is formed therethrough. After these stamping and embossing operations, the blank is perforated as shown at 24, and in the same operation shaved to the outline as indicated in Fig. 18 where the sides have been reduced as shown at 25, whereupon the upper portion of the blank 20 is bent at right angles to the lower portion thereof as shown in Figs. 19 and 20.

After the blank has been formed to the configuration shown (Figs. 19 and 20) the sides thereof are bent at right angles to the central portion as shown in Fig. 21 along the line 30. After these operations have been completed a pair of slots 25 and 31 are milled in the part to permit the part to rotate in the finally formed lock as shown in Fig. 24 without striking the stationary tumbler 26 (Fig. 25) in the lock which is of the type disclosed in the Shann Patent 1,793,254 mentioned hereinbefore. The final lock center or barrel is formed as shown in Figs. 22 and 23 wherein the bent-up sides form a key slot indicated generally by the numeral 36 which is a continuation of the slot 23 formed in the embossed portion 22 which in the finally assembled lock will nest in a corresponding cup shaped depression 27 (Fig. 25) in the lock casing. The downwardly extending portions 28, as viewed in Figs. 13 to 23 and which extend to the left in Fig. 25 and upwardly in Fig. 24, are adapted to receive a cap 29 having an undulating slot therein for receiving a key. The features of the lock other than the barrel or lock center constituting the subject matter of this invention are fully disclosed in the aforementioned patent to O. A. Shann. A cap suitable for use with this type of lock center is shown in Patent No. 2,093,104, issued September 14, 1937, to C. C. Veale and A. R. MacLagan.

What is claimed is:

1. In a lock, a lock center formed of relatively heavy sheet metal stock comprising an upper portion embossed to form a bearing surface and slotted to receive the end of a key, said upper portion having a bolt actuating portion formed integral therewith, a mid portion disposed at right angles to the upper portion, slotted sides bent at right angles to the mid portion and extending in a plane at right angles to the upper portion, and a lower portion formed to receive a key, said lower portion being formed to receive a cap.

2. The method of forming a barrel or center for a rotor center tumbler type lock which comprises punching a blank from sheet metal stock to a predetermined irregular configuration, embossing a bearing surface on the upper portion of said blank, slotting the upper portion of said blank, slotting the lower and mid portions of said blank, bending the upper portion of said blank at right angles to the mid portion thereof, bending the lower portion of said blank at right angles to the mid portion thereof and into a plane parallel with said upper portion, bending the sides of the mid portion at right angles to the remainder of the mid portion to form a pair of parallel side walls for receiving a key, and milling the sides of the mid portion.

3. A method of forming barrels or centers for rotor center tumbler type locks comprising punching a blank from sheet metal stock to a predetermined irregular configuration, forming an embossing thereon, punching a slot through said blank at the embossed portion thereof, bending the upper portion of said blank at right angles to the lower portion thereof, bending the sides of said lower portion at right angles to the remainder of said lower portion to form a pair of parallel walls, slotting the said walls to cooperate with a stationary tumbler in a lock, and milling the edges of said walls.

4. The method of forming a barrel or center for a rotor center tumbler type lock which comprises perforating a blank from sheet metal stock to a predetermined irregular configuration, embossing a bearing surface on the upper portion of said blank, slotting the upper portion of said blank, slotting the lower and mid portions of said blank, bending the upper portion of said blank at right angles to the mid portion thereof along a line extending between two of the perforations in the blank, bending the lower portion of said blank at right angles to the mid portion thereof and into a plane parallel with said upper portion along a line extending between two of the perforations, bending the sides of the mid portion at right angles to the remainder of the mid portion to form a pair of parallel side walls for receiving a key, and milling a part of the mid portions.

5. The method of forming a barrel or center for a rotor center tumbler type lock which comprises punching a blank from sheet metal stock to a predetermined irregular configuration, embossing a bearing surface on the upper portion of said blank, slotting the upper portion of said blank, slotting the lower and mid portions of said blank, bending the upper portion of said blank at right angles to the mid portion thereof, bending the lower portion of said blank at right angles to the mid portion thereof and into a plane parallel with said upper portion, first bending the sides of the mid portion to an angle of approximately 45° from the remainder of the mid portion, finally bending the sides approximately another 45° to move the sides to position at right angles to the remainder of the mid portion to form a pair of parallel side walls for receiving a key, and milling a portion of said sides.

6. The method of forming a barrel or center for a rotor center tumbler type lock which comprises punching a blank from sheet metal stock to a predetermined irregular configuration, embossing a bearing surface on the upper portion of said blank, slotting the upper portion of said blank, slotting the lower and mid portions of said blank, bending the upper portion of said blank at right angles to the mid portion thereof, bending the lower portion of said blank at right angles to the mid portion thereof and into a plane parallel with said upper portion, first bending the sides of the mid portion to an angle of approximately 45° from the remainder of the mid portion, and finally bending the sides approximately another 45° to move the sides to position at right angles to the remainder of the mid portion to form a pair of parallel side walls for receiving a key, and milling the edges of the sides of the mid portion for cooperation with the tumblers of the lock.

ANDREW L. SCHUYLER.
RICHARD B. KNOTH.
ALLAN R. MacLAGAN.